United States Patent
DiGiovanni et al.

(10) Patent No.: US 8,111,961 B2
(45) Date of Patent: Feb. 7, 2012

(54) ACCELERATED AGING OF PHOSPHORUS-DOPED OPTICAL FIBERS

(75) Inventors: David J. DiGiovanni, Mountain Lakes, NJ (US); Michael LuValle, Morristown, NJ (US); George E. Oulundsen, Belchertown, MA (US); Durgesh Shivram Vaidya, Southbridge, MA (US); Robert Lingle, Jr., Norcross, GA (US)

(73) Assignee: OFS Fitel, LLC, Norcross, GA (US)

( * ) Notice: Subject to any disclaimer, the term of this patent is extended or adjusted under 35 U.S.C. 154(b) by 933 days.

(21) Appl. No.: 12/072,433

(22) Filed: Feb. 26, 2008

(65) Prior Publication Data
US 2009/0211303 A1 Aug. 27, 2009

(51) Int. Cl.
G02B 6/02 (2006.01)
G02B 6/00 (2006.01)
B05D 5/06 (2006.01)
C03B 37/23 (2006.01)

(52) U.S. Cl. ...................... 385/123; 427/163.2; 427/162; 385/141; 65/385

(58) Field of Classification Search ................ 427/163.2; 385/123; 65/385
See application file for complete search history.

(56) References Cited

U.S. PATENT DOCUMENTS

| | | | |
|---|---|---|---|
| 4,339,173 A * | 7/1982 | Aggarwal et al. | 385/142 |
| 6,499,318 B1 * | 12/2002 | Lemaire et al. | 65/379 |
| 6,580,854 B1 * | 6/2003 | Enomoto et al. | 385/37 |
| 2005/0123255 A1 * | 6/2005 | Kashihara et al. | 385/123 |
| 2005/0268664 A1 * | 12/2005 | Jang et al. | 385/123 |
| 2007/0092191 A1 | 4/2007 | Koilakh et al. | |
| 2009/0214769 A1 * | 8/2009 | Digiovanni et al. | 427/163.2 |

OTHER PUBLICATIONS

Presby and Kaminow, Binary silica optical fibers: refractive index and profile dispersion measurements, Dec. 1976, Applied Optics, vol. 15 No. 12, 3029-3036.*

* cited by examiner

*Primary Examiner* — Dah-Wei Yuan
*Assistant Examiner* — Nga Leung V Law
(74) *Attorney, Agent, or Firm* — Law Firm of Peter V.D. Wilde

(57) ABSTRACT

Adverse hydrogen aging limitations in multiply-doped optical fibers are overcome by passivating these optical fibers using a deuterium passivation process. This treatment essentially pre-reacts the glass with deuterium so that the most active glass sites are no longer available to react with hydrogen in service. Optical fibers of main interest are doped with mixtures of germanium and phosphorus. Optimum passivating process conditions are described.

16 Claims, 4 Drawing Sheets

ACCELERATED AGING OF PHOSPHORUS-DOPED OPTICAL FIBERS

FIELD OF THE INVENTION

This invention relates to multimode fiber optimized for high capacity transmission around 850 nm as well as across wider bandwidths, and optical fiber transmission systems employing that fiber. More specifically it relates to methods for determining conditions for passivation of multiply-doped optical fibers to the effects of hydrogen.

BACKGROUND OF THE INVENTION

While single-mode fiber is a very efficient, low loss, lightwave transmission medium, and therefore used widely in applications like long haul communications where very low loss is a requirement, multi-transverse-mode optical fiber (hereinafter multimode fiber) fiber has an established status for short haul applications, and specialty fibers. For example, Local Area Network (LAN) applications have traditionally been based on low cost multimode fiber based systems. Such systems enable low cost by utilizing serial transmission, loose alignment tolerances between source and fiber end, and large alignment tolerances within connections and splices. To serve these applications effectively, the industry has set a standard for minimum acceptable transmission distance, and minimum optical fiber performance for that distance. The distance in current use is 300 meters for a single in-building optical link. In-building optical links comprise the vast majority of optical links in use today.

As data rates have increased to 10 Gb/s, the reach of traditional graded index multimode fibers is limited to distances of only 26 to 33 meters, using low cost multimode based serial systems.

The IEEE draft protocol for 10GBASE-LX4 is a four-channel WDM system operating around 1310 nm, that can support up to 300 meters on standard grade multimode fibers. This 10GBASE-LX4 solution has met with only modest success in the market due to high optical complexity and tight single mode tolerances, resulting in high cost.

As a result the 10GBASE-SR (Short Range) Vertical Cavity Surface Emitting Laser-based (VCSEL-based) serial transceivers operating at 850 nm were developed, in parallel with OM3 850 nm optimized multimode fiber. OM3 fibers, per the International Standards Organization (ISO) 11801 designation, are fibers with an effective modal bandwidth (EMB) of 2000 MHz.km at 850 nm. The integration of VCSEL launch and OM3 fiber provides a low cost 300 meter solution for 10 Gbps LAN, or Gbps Storage Area Network (SAN), transmission, and was standardized by IEEE802.3 in 2002. Typical reach is 1.1 km with state of the art OM3 compliant fiber. Since 10GBASE-SR over OM3 fiber is the lowest cost 10 Gb/s 300 meter system, it is the preferred system for new fiber installations.

Yet the industry still lacks a cost effective solution for installed non-OM3 multimode fiber.

Stimulated by the development of dispersion compensation schemes embedded in transmitter or receiver ends (either optical mode filtering or electronic dispersion compensation), IEEE has established the 802.3 10GBASE-LRM (Long Reach Multimode) protocol for 10Gbps single channel transmission at 1300 nm over installed-base Fiber Distributed Data Interface (FDDI) grade, OM2 grade, and OM3 grade, fibers. However, none of the FDDI grade, OM2, and OM3, grade fibers is optimized for 1300 nm performance with laser sources. In simulations by IEEE contributors to date, the 99% 10GBASE-LRM reach is demonstrated to be only 220 m for FDDI grade, but an acceptable 300 m for OM3 fiber using electronic dispersion compensation and an offset launch condition. The cost of 10GBASE-LRM is expected to be higher than 10GBASE-SR, but lower than 10GBASE-LX4 (the four channel multiplexed system), making it potentially viable in the market place for existing multimode fiber installations.

A reasonable next-step in higher speed transmission over multimode fiber would be 40 Gbps. The two most likely candidates are (what would be called) 40GBASE-SX4 supporting 300 meters over OM3 fiber, and 40GBASE-LRM supporting 220 meter over FDDI grade, OM2, and OM3 fibers. The 40GBASE-SX4 would be a CWDM (Coarse Wavelength Division Multiplexing) solution similar to the unsuccessful 10GBASE-LX4 solution, but with some key advantages: 1) Lower cost 850 nm VCSELs would be used instead of DFB (Distributed FeedBack) lasers, 2) Lower packaging cost would be enabled by multimode tolerances 10 times easier than the singlemode tolerances required for LX-4. 3) The use of conventional low cost CMOS integrated circuits is enabled with an SX-4 solution operating at 10 GHz frequencies, vs the more expensive silicon-germanium materials required for the 40 GHz ICs used for serial 40 Gb/s solutions.

The next speed of Ethernet, likely to be captured in IEEE standards, is not 40 GbE but rather 100 GbE, with at least one multimode fiber solution included. One solution would be 10×10 Gb parallel transmission over multimode fiber in ribbons. This solution would be very cost effective up to 100 m, but would become more expensive than CWDM solutions beyond 200 m. A multimode fiber that allows multiple 10 Gb wavelengths on a broadband fiber, with transmitter options that preserve the low cost advantage, may be the most attractive solution for 100 GbE. Such a fiber, however, should maintain the lowest cost value offered today for 1 and 10 GbE transmission at 850 nm.

Thus multimode fibers are needed that are optimized across broad wavelength ranges, coupled with appropriate laser launch conditions, for wavelengths to at least 300 meters, and data rates at 1, 10, and 100 Gb/s. The objective is to design fibers that maintain the present low cost for 1 or 10 Gbps at 850 nm, while opening up other wavelength bands for CWDM of 10 and 20 Gbps transmission.

We have designed a new class of multimode optical fibers optimized for operation across broad wavelength ranges. These are aimed at applications using 1, 10 and 100 Gb/s data rates at 850 nm, as well as lengths of at least 300 meters.

The improved multimode optical fibers have cores doped with aluminum and/or phosphorus. In preferred embodiments they are doped with germanium and phosphorus, or germanium and aluminum. Optical fibers with these multiply doped cores are shown to provide the optical transmission qualities necessary to meet new standards for short haul optical fiber links. More details on these multiply doped optical fibers are set forth in U.S. application Ser. No. 11/511,174, which is incorporated by reference herein.

However, we have also observed that, while these optical fiber designs provide very effective solutions for low cost, high performance, multimode fiber applications, some optical fibers with phosphorus or aluminum doping have unexpectedly high sensitivity to hydrogen contamination. Thus the long term aging qualities of fiber doped with phosphorus and/or aluminum may limit the effectiveness of these optical fibers for some applications.

SUMMARY OF THE INVENTION

In response to the observations and discoveries just outlined, we propose to overcome the adverse hydrogen aging limitations by passivating these optical fibers using a deuterium passivation process. This treatment essentially pre-reacts the glass with deuterium so that the most active glass sites are no longer available to react with hydrogen in the field.

However, passivation with deuterium often increases the initial attenuation of the fiber and for some fiber types or certain regimes of passivation, the resulting fiber can have significantly higher attenuation at end of life than an untreated fiber. Loss caused by both passivation and hydrogen exposure during life varies greatly depending on glass composition, so commercially important fiber types, like singlemode fiber, erbium doped fiber and multimode fiber, all behave differently. Optimum passivation conditions exist, but because the theory of defect passivation is not well understood, choice of passivation conditions has not been well-founded.

To advance the technology of deuterium passivation, a new theory of kinetics has been developed which allows improved prediction of fiber loss due to passivation and during installation lifetime. This theory allows optimization of passivation conditions of exposure temperature, exposure pressure and exposure time. An important aspect is calculation of hydrogen and deuterium activity and a method for balancing loss between the deuterium and hydrogen. That allows new methods for deuterium passivation of optical fibers to be defined.

BRIEF DESCRIPTION OF THE DRAWING

The methods may be more easily understood with the aid of the drawing, in which.

DETAILED DESCRIPTION

Figure 1:
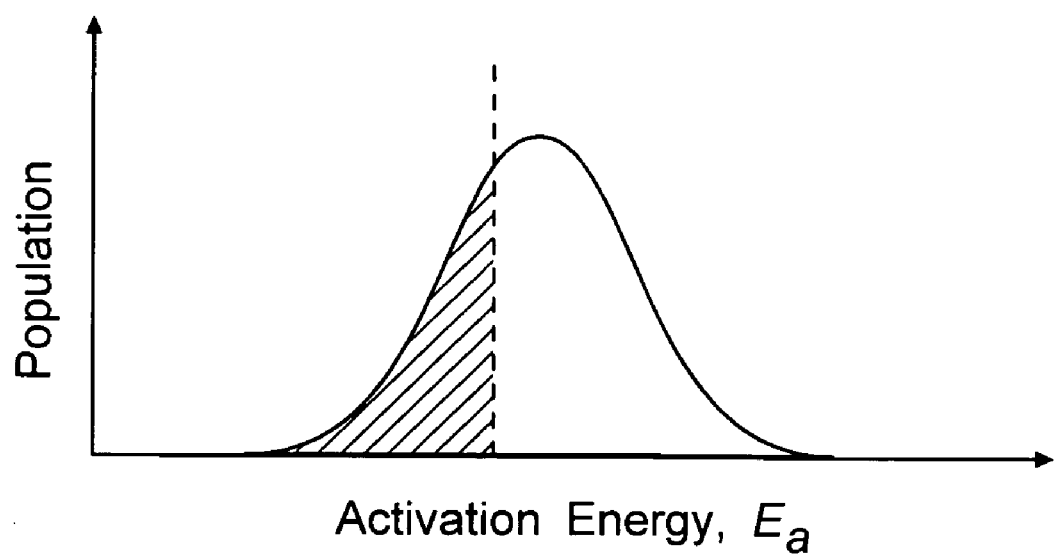
FIG. 1 illustrates the distribution of activation energies among reactive sites in the glass fiber.

A traditional graded-index multimode fiber has a quasi-parabolic refractive index profile that causes the modes of the fiber to travel at close to the same speed, minimizing modal dispersion and giving maximum bandwidth at a particular wavelength. Away from that wavelength, the propagation velocity of the fiber modes becomes different. At wavelengths longer than optimum wavelength, higher order modes travel more slowly than the lower modes. At wavelengths shorter than the optimum, higher order modes travel faster than lower modes. Modal delays may also differ because of deviations from ideality in the profile in a real fiber. A common family of so-called "center defects" occurs near r=0 in the multimode fiber refractive index profile. Modified Chemical Vapor Deposition (MCVD), Plasma enhanced Chemical Vapor Deposition (PCVD), or Outside Vapor Deposition (OVD) processes all require the collapse of a hollow body, so that the profile along the centerline of the multimode fiber is subject to perturbations introduced during the collapse process. These center defects degrade high-speed transmission for energy launched near the center of the fiber. Other non-idealities include "kinks," i.e. bumps or dips, at arbitrary locations on the profile, cause sudden shifts in mode delay.

Deviations in the profile near the core-clad boundary are also common in the OVD process where diffusion of dopants occurs readily in soot bodies during dehydration.

The lightwave power capacity of a fiber can be quantified in several ways. Overfill bandwidth (OFL-BW) is of limited use for characterizing fibers for laser launch applications. Values of (Max−Min) centroid delays or mask widths derived from differential mode delay (DMD) measurements are more appropriate. DMD 0-23 micron mask width values <0.33 ps/nm are preferred for 10 Gbps transmission over 300 m with VCSELs wherein the Mode Power Distribution (MPD) is constrained to meet the IEEE 802.3ae 10GBASE-SR standard. An equivalent objective is a modal bandwidth of >2 GHz-km under certain laser launch condition. For 850 nm 10 Gbps transmitters constrained to have encircled flux less than 30% at r<4.5 um, and less than 86% at r<19 um, a set of weighting functions were developed in TIA/EIA-492AAAC-A which can be applied to high resolution DMD measurements to derive the "calculated Effective Modal Bandwidth" or EMBc. The lowest EMBc value of the set of 10 values should be above 2 GHz-km to guarantee that a given fiber will provide 10 Gbps capacity over any transmitter meeting the 802.3ae specifications.

The effect of modal delays changing rapidly away from the optimum wavelength can be understood by considering the phenomenon known as profile dispersion. Profile dispersion is determined by the composition of dopants. When only Ge dopant is used for multimode fiber, profile dispersion has larger variation, with a high slope across the broad wavelengths range (750~1600 nm). With less Ge, and mixing with other dopants such as P or Al, the profile dispersion becomes flatter and gives high bandwidth fiber over the wide wavelength range.

The inventive multimode fiber designs comprise multiply-doped fibers where, in general, a dopant such as Al or P is used to reduce the concentration of Ge required to achieve the requisite numerical aperture (NA) of the fiber. Fluorine may also be used in the fiber cladding to reduce the required amount of positive index dopant. Al and P raise the index of silica, while F depresses the index of silica. The dispersion of Ge-doped silica is generally higher than the dispersion of Al or P-doped silica, so that fiber modal dispersion is lower when $Al_2O_3$ or $P_2O_5$ displaces $GeO_2$ as the index-raising dopant. In general, dopant profiles of positive dopants such as Ge, Al or P oxides will be quasi-parabolic, characterized by the parameter "alpha" ($\alpha$) where $\alpha$ is typically approximately 2 (e.g., 2+/−0.3).

Fibers are described in which the dopant is solely comprised of Al, or solely of P, or the dopants are multiple combinations comprising of Ge and Al, or Ge and P, or Ge and Al and P. The cladding of the fiber may also comprise F-doped glass, reducing the total amount of index-raising dopant necessary to achieve the target NA. It may be advantageous to mix dopants for one or more of several reasons. For example, mixing the dopants will produce better modal dispersion than with either dopant alone; and scattering or aging losses may be improved in some cases in fibers with mixed dopants.

Table 1 describes 50 micron fiber design parameters having desirable properties described further below.

TABLE 1

| Fiber sample | Alpha | Ge(Delta) | P(Delta) | Al(Delta) | F Cladding (Delta) |
|---|---|---|---|---|---|
| F1 | 2.04 | 0.01 | 0 | 0 | 0 |
| F2 | 2.04 | 0 | 0 | 0.01 | 0 |
| F3 | 2.04 | 0 | 0 | 0.008 | −0.002 |
| F4 | 2.04 | 0.006 | 0 | 0.002 | −0.002 |
| F5 | 2.04 | 0.004 | 0 | 0.004 | −0.002 |
| F6 | 2.03 | 0.0025 | 0.0075 | 0 | 0 |
| F7 | 2.04 | 0.0025 | 0.0075 | 0 | 0 |
| F8 | 2.05 | 0.0025 | 0.0075 | 0 | 0 |
| F9 | 2.06 | 0.0025 | 0.0075 | 0 | 0 |
| F10 | 2.07 | 0.0025 | 0.0075 | 0 | 0 |
| F11 | 2.08 | 0.0025 | 0.0075 | 0 | 0 |

General approaches for improving multimode bandwidth by using multiple dopants have been known for many years. See, for example, Kaminow and Presby, A O, Vol. 16, No. 1, p. 108, January, 1977; R. Olshansky, A O, Vol. 18, No. 5, p. 683, January, 1979. However, these fibers have not achieved commercial success for various reasons. Much work was done on multiply doped fibers prior to the advent of laser launch, at a time when the requirements for high-speed transmission were not well understood. We describe specific fiber designs, as well as specific combinations of fibers and sources, based on new understandings, and which enable high-speed transmission over multiple wavelengths in novel and unique ways.

The modal bandwidth of a multimode fiber depends on the laser launch conditions with which it is used. The lowest cost is achieved when launch requirements allow loose alignment tolerances between the laser and fiber. A +/−~five micron tolerance for VCSEL launch is highly beneficial for the cost of existing 850 nm transmitters at 1 and 10 Gbps. VCSEL transmitters at wavelengths other than 850 nm should meet similar modal power distributions as those for the 802.3ae. Accordingly, the worst-case EMBc is reached by applying the ten TIA weighting functions as a measure of the bandwidth of the inventive wide band multimode fibers across a range of wavelengths.

In theory, a single mode laser with a launch having similar loose tolerances would be a desirable low cost launch option (at the wavelength at which the fiber is optimized). However edge-emitting lasers with industrial reliability are not optimized for 850 nm, while 10 Gbps single mode and directly modulated Fabry-Perot (FP) or DFB lasers coupled to a 1300 nm optimized fiber have not been accepted by standards bodies in the past. Nonetheless, future applications of wideband fibers may beneficially use edge-emitting InP lasers in the range around 980 to 1120 nm for low cost transmission. For a perfect center launch, at very high cost to manufacture, a multimode fiber with no center defects would be inherently broadband, since the several lowest order modes have small differences in modal delay. However it is useful to consider loose tolerance coupling of a single mode laser to a multimode fiber for low cost, as well as to account for the effects of connector, which will launch away from the center as well. Two worst case connects near 7 micron offset can be approximated by a single 9 micron offset launch. We use the modal bandwidth of a 9 micron single mode offset launch as one metric of the expected performance of the inventive fibers described herein.

The Al-doped fibers described in TABLE I have desirable properties for 10 Gbps transmission described by 0-23 micron mask width (TABLE 2 below), worst-case modal bandwidth for VCSEL launch (TABLE 3 below), and 9 micron single mode offset launch modal bandwidths (TABLE 4 below).

TABLE 2

| MW23 (ps/m) | 750 nm | 775 nm | 800 nm | 825 nm | 850 nm | 875 nm |
|---|---|---|---|---|---|---|
| F1 | 0.29 | 0.23 | 0.17 | 0.09 | 0.02 | 0.05 |
| F2 | 0.14 | 0.12 | 0.10 | 0.05 | 0.02 | 0.02 |
| F3 | 0.08 | 0.06 | 0.05 | 0.04 | 0.02 | 0.02 |
| F4 | 0.15 | 0.11 | 0.09 | 0.03 | 0.02 | 0.05 |
| F5 | 0.19 | 0.16 | 0.14 | 0.10 | 0.06 | 0.04 |

| MW23 (ps/m) | 900 nm | 925 nm | 980 nm | 1120 nm | 1300 nm | 1550 nm |
|---|---|---|---|---|---|---|
| F1 | 0.10 | 0.15 | 0.26 | 0.48 | 0.76 | 1.12 |
| F2 | 0.04 | 0.06 | 0.10 | 0.18 | 0.25 | 0.34 |
| F3 | 0.02 | 0.03 | 0.05 | 0.09 | 0.13 | 0.18 |
| F4 | 0.08 | 0.11 | 0.17 | 0.30 | 0.44 | 0.63 |
| F5 | 0.02 | 0.03 | 0.07 | 0.17 | 0.27 | 0.41 |

TABLE 3

| EMBc (GHz·km) | F1 | F2 | F3 | F4 | F5 |
|---|---|---|---|---|---|
| 750 nm | 1.29 | 2.48 | 4.01 | 2.46 | 1.99 |
| 775 nm | 1.70 | 3.21 | 5.03 | 3.32 | 2.41 |
| 800 nm | 2.46 | 4.25 | 6.24 | 4.78 | 2.95 |
| 825 nm | 4.49 | 6.71 | 7.74 | 8.49 | 4.10 |
| 850 nm | 10.70 | 10.64 | 10.66 | 10.36 | 6.32 |
| 875 nm | 6.68 | 10.73 | 11.17 | 6.69 | 9.15 |
| 900 nm | 3.50 | 7.59 | 10.99 | 4.63 | 13.24 |
| 925 nm | 2.46 | 5.79 | 9.40 | 3.46 | 10.26 |
| 980 nm | 1.41 | 3.69 | 6.96 | 2.18 | 4.97 |
| 1120 nm | 0.77 | 2.04 | 4.04 | 1.24 | 2.17 |
| 1300 nm | 0.49 | 1.48 | 2.79 | 0.83 | 1.37 |
| 1550 nm | 0.33 | 1.05 | 2.06 | 0.59 | 0.89 |

TABLE 4

| SML9 (GHz·km) | F1 | F2 | F3 | F4 | F5 |
|---|---|---|---|---|---|
| 750 nm | 1.67 | 1.74 | 1.75 | 1.73 | 1.72 |
| 775 nm | 1.91 | 1.96 | 1.97 | 1.97 | 1.95 |
| 800 nm | 2.19 | 2.22 | 2.22 | 2.21 | 2.20 |
| 825 nm | 2.48 | 2.50 | 2.50 | 2.50 | 2.48 |
| 850 nm | 2.81 | 2.81 | 2.81 | 2.81 | 2.81 |
| 875 nm | 3.12 | 3.15 | 3.16 | 3.12 | 3.17 |
| 900 nm | 3.34 | 3.50 | 3.53 | 3.40 | 3.56 |
| 925 nm | 3.49 | 3.89 | 3.97 | 3.75 | 4.00 |
| 980 nm | 3.22 | 4.57 | 5.05 | 4.01 | 4.90 |
| 1120 nm | 1.87 | 4.23 | 6.73 | 2.90 | 4.63 |
| 1300 nm | 1.01 | 2.67 | 4.76 | 1.64 | 2.49 |
| 1550 nm | 0.53 | 1.51 | 2.83 | 0.88 | 1.28 |

The P-doped fibers described in TABLE I have desirable properties for 10 Gbps transmission described by 0-23 micron mask width (TABLE 5 below), worst-case modal bandwidth for VCSEL launch (TABLE 6 below), and 9 micron single mode offset launch modal bandwidths (TABLE 7 below).

TABLE 5

| MW23 (ps/m) | 750 nm | 775 nm | 800 nm | 825 nm | 850 nm | 875 nm |
|---|---|---|---|---|---|---|
| F6 | 0.212 | 0.202 | 0.177 | 0.177 | 0.146 | 0.146 |
| F7 | 0.126 | 0.116 | 0.091 | 0.081 | 0.061 | 0.061 |

TABLE 5-continued

| | | | | | | |
|---|---|---|---|---|---|---|
| F8 | 0.040 | 0.030 | 0.015 | 0.015 | 0.020 | 0.025 |
| F9 | 0.035 | 0.051 | 0.066 | 0.081 | 0.091 | 0.101 |
| F10 | 0.111 | 0.136 | 0.146 | 0.162 | 0.177 | 0.187 |
| F11 | 0.202 | 0.222 | 0.232 | 0.247 | 0.253 | 0.268 |

| MW23 (ps/m) | 900 nm | 925 nm | 980 nm | 1120 nm | 1300 nm | 1550 nm |
|---|---|---|---|---|---|---|
| F6 | 0.101 | 0.096 | 0.101 | 0.081 | 0.081 | 0.111 |
| F7 | 0.025 | 0.020 | 0.025 | 0.015 | 0.015 | 0.051 |
| F8 | 0.040 | 0.045 | 0.051 | 0.061 | 0.045 | 0.005 |
| F9 | 0.111 | 0.121 | 0.131 | 0.136 | 0.111 | 0.051 |
| F10 | 0.187 | 0.197 | 0.212 | 0.207 | 0.177 | 0.111 |
| F11 | 0.258 | 0.273 | 0.288 | 0.283 | 0.247 | 0.167 |

TABLE 6

| EMBc (GHz · km) | F6 | F7 | F8 | F9 | F10 | F11 |
|---|---|---|---|---|---|---|
| 750 nm | 1.74 | 2.75 | 5.72 | 6.05 | 2.96 | 1.84 |
| 775 nm | 1.89 | 3.17 | 7.10 | 5.26 | 2.61 | 1.70 |
| 800 nm | 2.15 | 3.94 | 8.88 | 4.67 | 2.39 | 1.60 |
| 825 nm | 2.28 | 4.42 | 9.75 | 4.08 | 2.19 | 1.50 |
| 850 nm | 2.57 | 5.66 | 9.78 | 3.67 | 2.06 | 1.48 |
| 875 nm | 2.71 | 6.29 | 9.00 | 3.39 | 1.99 | 1.39 |
| 900 nm | 3.45 | 9.78 | 7.49 | 3.23 | 1.98 | 1.44 |
| 925 nm | 3.68 | 11.58 | 7.00 | 3.02 | 1.89 | 1.37 |
| 980 nm | 3.75 | 13.49 | 6.50 | 2.74 | 1.77 | 1.30 |
| 1120 nm | 4.67 | 21.18 | 5.53 | 2.65 | 1.78 | 1.31 |
| 1300 nm | 4.48 | 21.68 | 7.51 | 3.28 | 2.09 | 1.51 |
| 1550 nm | 3.24 | 6.70 | 36.55 | 6.65 | 3.24 | 2.19 |

TABLE 7

| SMCL (GHz · km) | F6 | F7 | F8 | F9 | F10 | F11 |
|---|---|---|---|---|---|---|
| 750 nm | 1.76 | 1.76 | 1.76 | 1.76 | 1.76 | 1.76 |
| 775 nm | 1.98 | 1.98 | 1.98 | 1.98 | 1.98 | 1.98 |
| 800 nm | 2.22 | 2.22 | 2.22 | 2.22 | 2.22 | 2.22 |
| 825 nm | 2.50 | 2.50 | 2.50 | 2.50 | 2.50 | 2.50 |
| 850 nm | 2.81 | 2.81 | 2.81 | 2.81 | 2.81 | 2.81 |
| 875 nm | 3.17 | 3.17 | 3.17 | 3.17 | 3.17 | 3.17 |
| 900 nm | 3.57 | 3.57 | 3.57 | 3.57 | 3.57 | 3.57 |
| 925 nm | 4.04 | 4.04 | 4.04 | 4.04 | 4.04 | 4.04 |
| 980 nm | 5.35 | 5.35 | 5.35 | 5.35 | 5.35 | 5.35 |
| 1120 nm | 12.00 | 13.06 | 12.03 | 9.54 | 7.56 | 5.97 |
| 1300 nm | 14.39 | 57.34 | 18.38 | 7.96 | 5.69 | 4.01 |
| 1550 nm | 5.10 | 8.99 | 10.79 | 7.19 | 4.67 | 3.36 |

The multiply-doped fibers may have index profiles characterized by multi-alpha parabolic exponents to equalize mode dispersion as a function of launch mode power distribution, and/or with subtle features such as steps, depths, kinks, added to further suppress particular mode groups, and/or longitudinal periodic structures to increase mode mixing effects. The size of the fiber may be 62.5 um/125 um, 50 um/125 um, or other size. Smaller cores, with less core germanium concentration, may be preferred from the standpoint of lowering loss. The multiply-doped fibers have OFL bandwidth of >1200 MHz.km at 850 nm and 500 MHz-km at 1300 nm.

Dispersion compensation schemes such as electronic dispersion compensation, optical mode filtering, and spatial segmented detection, can be used in either transmitter or receiver ends to increase transmission bit rate and extend reach. In particular, fibers with modal bandwidths >1 GHz-km around 1310 nm will be easier to equalize with EDC at low cost, than standard OM3 fibers.

The multiply-doped glass compositions and optical fiber profiles discussed here are processed by conventional methods to form preforms, and to draw optical fiber.

In investigations of these multiply-doped optical fibers it was found that, while they provide exceptional optical characteristics, they are more susceptible than would be predicted to degradation due to hydrogen contamination. Degradation occurs as the result of well-known formation of water peaks that form as the result of hydrogen bonding. The water peaks (OH⁻ bonds) absorb light in the typical wavelength range of the signal. Degradation becomes particularly severe when the concentration of phosphorus and/or aluminum exceeds 2%.

To overcome this, optical fibers with the compositions described are passivated by treating the optical fibers in a heated atmosphere of deuterium. The treatment conditions determine the effectiveness of the passivation treatment. The treatment conditions are essentially: time of treatment, concentration of deuterium, and treatment temperature.

We have analyzed the hydrogen contamination process in detail to enable determination of optimum passivation processes.

Figure 2:
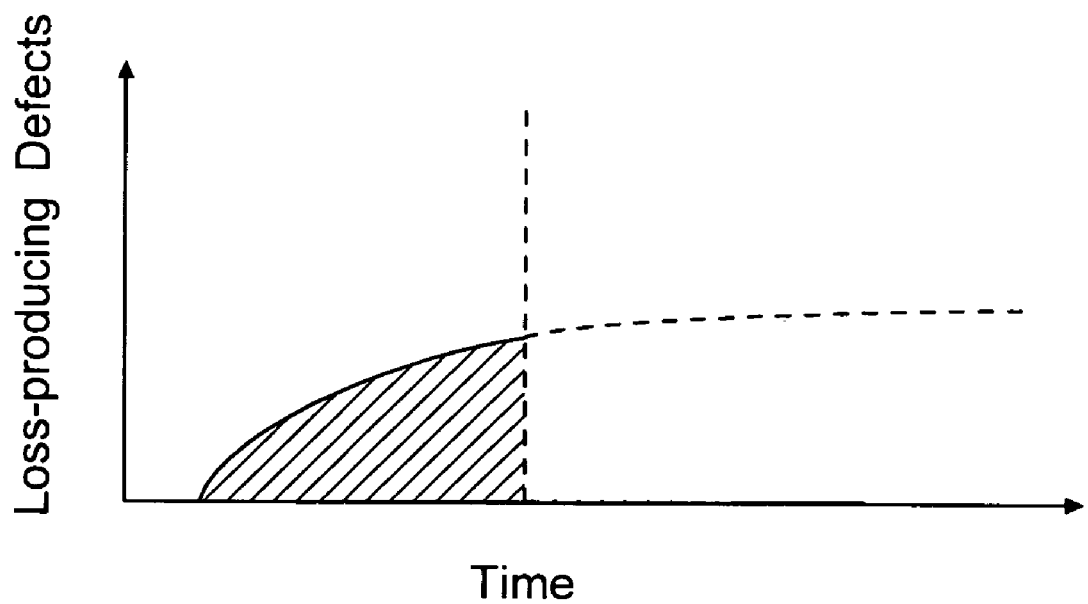
FIG. 2 is a representative plot showing growth in reacted sites with time.

Hydrogen contamination is essentially a three-stage process. First, hydrogen diffuses into the fiber from the surrounding material or atmosphere. Then, this interstitial hydrogen becomes an active form capable of reacting to form defects. Usually this transformation to an active form is a reversible process and can be modeled either as a splitting of the hydrogen molecules to form radicals or as an adsorption isotherm, similar to a Langmuir isotherm. Finally, the active form of hydrogen reacts with existing sites in the glass to form loss-causing defects. Data to date indicates that the reaction occurs with a broad distribution of activation energies. This is illustrated in FIG. 1, which shows the number density of sites with activation energy, $E_a$. Since the rate of reaction can be represented as rate $\sim\exp[-E_a/kT]$, sites with lowest activation energy are consumed first and the reaction rate gets progressively slower. The reaction is represented by the shaded region in FIG. 1, which indicates the population of defects that have reacted with available hydrogen due to exposure at some temperature for some time. As time progresses, more sites are consumed and the growth of the population of reacted sites grows to some asymptotic limit because there is a finite set of glass sites that hydrogen can occupy. The extent of reaction and creation of loss-producing defects grows with time, as illustrated in FIG. 2.

Optical fibers such as transmission fiber and erbium-doped fiber can be sufficiently sensitive to reaction with hydrogen at typical operating temperatures and hydrogen levels that the change in optical loss over time is unacceptable. To remedy this, passivation procedures have been developed to produce fibers that are more stable over time. Successful passivation reacts the lowest-lying sites and thereby slows the subsequent reaction at operating conditions without inducing unacceptable initial background loss. To reduce the initial increase in background loss during passivation, deuterium may be substituted for hydrogen. Since deuterium is chemically similar to hydrogen, the kinetics of reaction with available glass sites is also very similar. However, because of the increase in atomic weight, the absorption spectra associated with deuterium species in glass is radically different than hydrogen. In particular, the hydroxyl overtone around 1.38 microns in silica, which is responsible for most of the optical loss in the telecommunications window around 1.55 microns, is shifted away from the window. This reduces the impact on loss of reaction with deuterium. Thus passivation with deuterium can induce relatively little attenuation of the signal wavelength.

Figure 3:
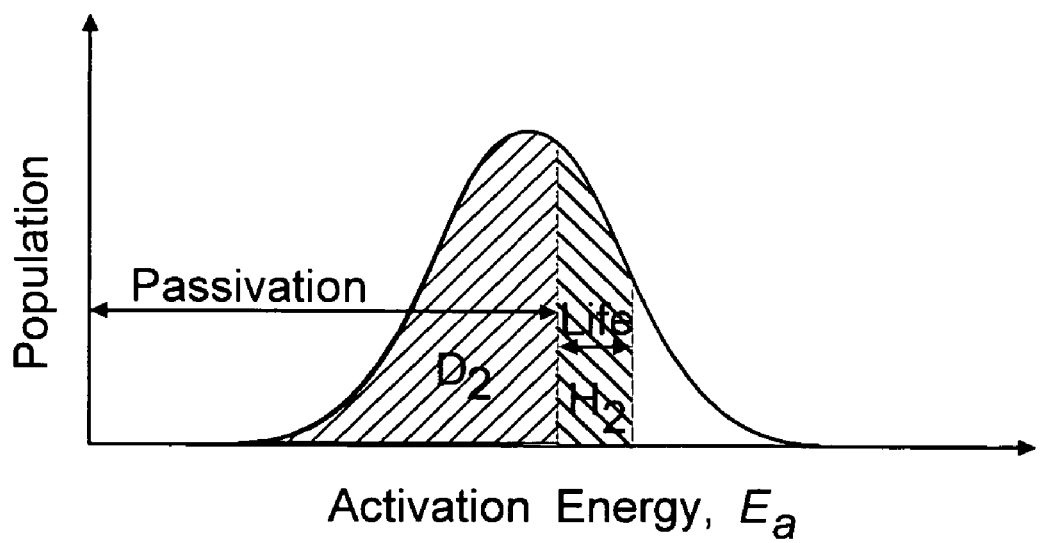
FIG. 3 is a plot showing the distribution of activation energies among reactive sites in a passivated optical fiber.
Figure 4:
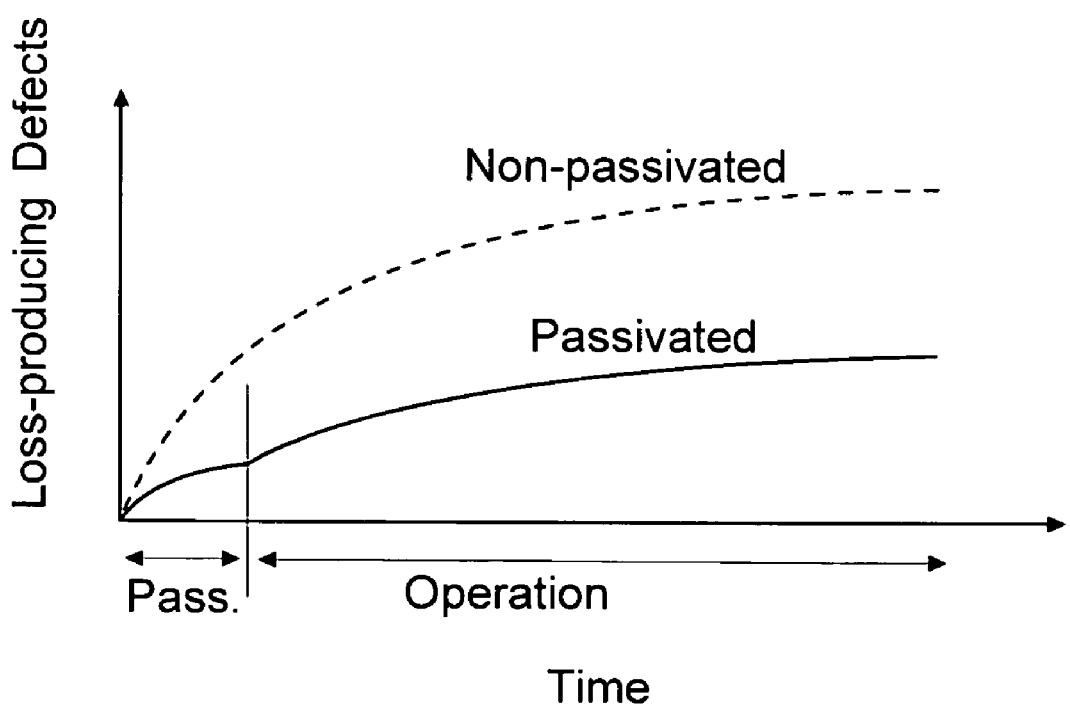
FIG. 4 is a plot similar to that of FIG. 2 comparing passivated and non-passivated optical fibers.

The effect of typical passivation is illustrated in FIGS. 3 and 4, which show a population of sites reacted with deuterium during passivation. In practice, the induced loss is small and can be accounted for prior to placing the optical fiber in service. In service, the hydrogen sites remaining (the sites that were not passivated) have higher activation energy than those consumed during passivation, so the reaction rate proceeds more slowly. The additional optical loss in service should therefore be small, despite the higher molar absorption of hydrogen. This renders the fiber much more stable over time than a non-passivated fiber.

Passivation essentially accelerates the consumption of the lowest-lying sites, using accelerated conditions, i.e., much higher temperature and gas pressure than anticipated in service, and fills the sites with species that are relatively lossless.

This behavior suggests that the increase in loss due to exposure of optical fiber to hydrogen or deuterium is dictated by the distribution of activation energies of the available defect sites and the history of time, temperature and hydrogen or deuterium activity. A simple approximate model of the contamination process is that the time for a given temperature-pressure condition can be scaled to produce a single mastercurve using the transformation:

$$E_a = kT \log(v[H^*]_t) \quad (1)$$

where $E_a$ is activation energy, v is a frequency factor, k is Boltzmann's constant, T is absolute temperature, and $[H^*]_t$ is an integrated hydrogen activity term that includes diffusion into the glass, solubility of hydrogen in the glass, and the chemical activation of the molecular hydrogen over time (see e.g. SPIE V 3848, pp 260-271, LuValle et al., incorporated herein by reference). Creation of a mastercurve allows correlation of experimental data from accelerated testing over a wide range of temperatures, pressures and times, and enables accurate prediction at a different set of temperatures, pressures and times.

The concepts discussed can be used to allow accurate prediction of the growth of optical loss in a fiber during its service lifetime. Since the reaction with deuterium shifts the optical absorption of the reacted defects away from the wavelength of operation, the loss induced during passivation with deuterium is relatively small. Focus has therefore been on calculating the expected growth of loss during operation, and determining an appropriate level of passivation to attain adequate end-of-life characteristics. Any attenuation due to passivation has been relatively minor and treated as a necessary cost. Since typical passivation conditions may entail temperatures in excess of 100° C. for many hours, in some cases the passivation process is limited by coating degradation or simple fiber processing cost, rather than by induced optical loss.

However, we have discovered situations in which previous methods are inadequate in assuring suitable operation. In particular, for some of these situations the loss incurred during passivation can be excessively high. For example, recently developed multimode fibers (see application Ser. No. 11/511,174), with core compositions containing germanium and phosphorus, exhibit very high reactivity with hydrogen. This indicates a need for much higher degrees of passivation than that required for conventional Ge doped singlemode fibers. The result is a large increase the amount of deuterium reacted in the glass. In addition, where the intended operating wavelength range is broad, for example from 850 nm to 1300 nm, that wavelength range includes at least one OD⁻ absorption peak. In that situation, loss induced during standard passivation can exceed that of a non-passivated fiber.

Other fibers exhibit similar excessive loss due to passivation, such as erbium doped fibers intended for exposure to harsh environments or high-reliability applications. These fibers may have high concentrations of aluminum.

In these instances, a balanced approach is desirable to minimize the combination of loss from passivation and operation. To accomplish this, the underlying reaction dynamics must be understood and utilized.

The analysis of the effects of passivation discussed above suggests that a given population of reactive sites can be consumed by reaction with hydrogen or deuterium through an infinite combination of gas pressure, exposure temperature and exposure duration. For example, at a fixed hydrogen pressure, a fiber held at high temperature for a short time will incur the same optical loss as a fiber held at low temperature for a long time. This occurs because there is a single population of reactive sites with a single distribution of activation energy, and equivalent treatments consume the same population of reactive glass sites. This behavior has been verified for a several glass types.

In some cases, this behavior does not hold if there is more than one population of sites and the populations have different distributions of activation energies. We have found such instances in studying the effects of ionizing radiation on complex glass systems.

Figure 5:
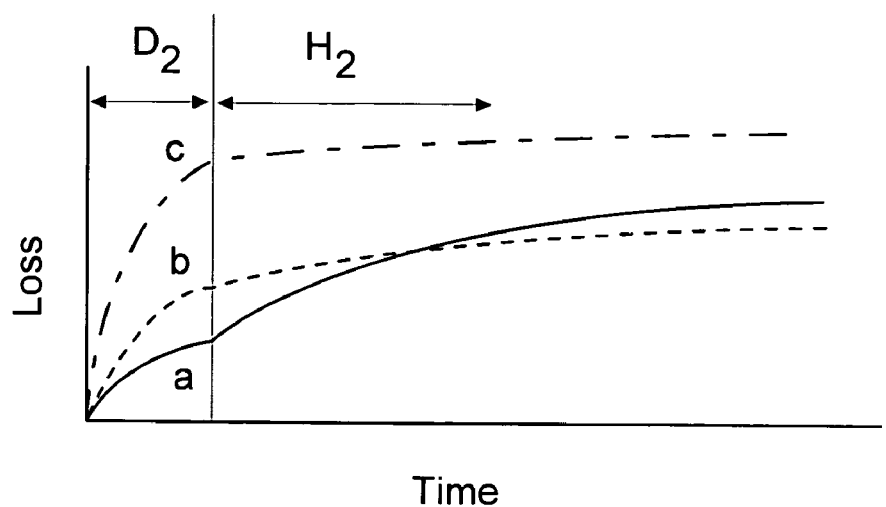
FIG. 5 is a plot of loss vs. time comparing results for three different hypothetical conditions of passivation with deuterium, followed by operation in hydrogen for long time.

Although the same population of reactive sites can be accessed by multiple combinations of pre-treatment and operation, the final optical loss may be different due to the fact that the optical loss induced by hydrogen is much greater than by deuterium. Thus, for glasses and chemical mechanisms in which there is effectively a single population of reactive sites, the above discussion implies that if the duration and conditions of lifetime operation are defined, then passivation conditions can be optimized to minimize the amount of optical loss at end of life. This is illustrated in FIG. 5, which shows the result of two different hypothetical conditions of passivation with deuterium, followed by operation in hydrogen for long time. In curve (a), the fiber was treated at low temperature and, although the initial loss during passivation was low, after long service time the total attenuation grows considerably. Curve (b) shows more aggressive passivation (at higher temperature, for example), resulting in more incurred passivation loss, but subsequent reactivity has been slowed sufficiently so that after long service time the total incurred loss is lower than in curve (a). Yet more aggressive passivation in curve (c) renders the fiber quite stable to degradation in service, but this does not compensate for the high passivation loss, and the end-of-life loss is higher than curve (b). Thus it is shown that the passivation process can be too severe as well as too mild. While it would normally be assumed that an effective passivation process may only need to account for a passivation threshold, the afore-stated understanding establishes that optimum passivation conditions have both a maximum as well as a minimum. Thus in designing a deuterium passivation process it is desirable to calculate not only the lower limits of process conditions but the upper limits as well.

In addition to the difference in optical loss magnitude and spectrum caused by deuterium and hydrogen, the rate of diffusion of molecular species through the polymer and glass cladding differ significantly. In contrast, the difference in the kinetic behavior between deuterium and hydrogen is relatively minor. Each of these differences can be incorporated with appropriate scaling in the mastercurve. A typical procedure is to perform a set of experimental tests using accelerated conditions of temperature, pressure and time to determine the mastercurve, from which the $[H^*]_t$ function can be determined. Use of the $[H^*]_t$ function then allows the temperature-pressure-time conditions for deuterium passivation to be determined to minimize end-of-life loss Note that once $[H^*]_t$ is known as a function of temperature and pressure, one can use the measured change in optical loss to back-calculate the concentration of hydrogen to which the fiber was exposed in the field. This can be a useful tool for monitoring fiber installations or devices to detect equipment problems or imminent failure.

One aspect of the invention is an experimental protocol for determining $[H^*]_r$. The diffusion constant and solubility of $H_2$ in silica as a function of temperature and pressure can be obtained from the literature (e.g. Lemaire, Optical engineering, June 1981, V30, no 6, pp 781 equations 2 and 3). Thus we can find the local concentration of $H_2$ in the fiber and using the experimentally measured growth of loss over time, the hydrogen activity can be determined.

We have found that the chemical activation of hydrogen is strongly dependent on glass composition. With significant doping of elements from column IIIA of the periodic table, activity is dominated by the dissociation of hydrogen into hydrogen radicals. For example, aluminum doping reduces the activation energy for dissociation from 4.48 eV to ~1 eV. This catalysis is probably the result of the ability of aluminum (like boron) to hybridize across its empty orbital to create 3 center bonds.

Alternatively, in fibers without IIIA elements, the dominant activity is adsorption of $H_2$ directly onto the loss-generating site with subsequent splitting of the hydrogen-hydrogen bond. In this case, the activity has the form of an adsorption isotherm, with general form $$\frac{1+A}{1+\frac{A}{B\times[H_2]}} \text{ with } [H_2]$$

determined directly from the diffusion and solubility, and A and B estimated experimentally.

The general form of hydrogen-induced darkening in a fiber can be described by the system of equations:

$$\frac{d[H_2]}{dt} = -k_1[H_2] + k_2[\dot{H}]^2 \quad (2)$$

$$\frac{d[\dot{H}]}{dt} = k_1[H_2] - k_2[\dot{H}]^2 - \sum_{i=1,\ldots,n} k_{3i}[\dot{H}]$$

$$\frac{d[D_i]}{dt} = -k_{3i}[D_i]\left(p[\dot{H}] + (1-p)\frac{1+A}{1+\frac{A}{B\times[H_2]}}\right),$$

$$i = 1, \ldots, n$$

$$\frac{d[L_\lambda]}{dt} = \alpha_\lambda \sum_{i=1,\ldots,n} k_{3i}[D_i]\left(p[\dot{H}] + (1-p)\frac{1+A}{1+\frac{A}{B\times[H_2]}}\right)$$

where $$k_j = v_j\exp\left(-\frac{E_{aj}}{kT}\right), j = 1, 2$$

$$k_{3i} = v_3\exp\left(-\frac{E_{a3i}}{kT}\right), i = 1, \ldots, n$$

Here $[\dot{H}]$ is the concentration of hydrogen radicals, the v terms are frequency factor for the Arrheniuos relation, k is Boltzmann's constant, T is absolute temperature, $[L_\lambda]$ is the optical loss per unit length at wavelength $\lambda$, and $D_i$ terms represent the population of sites in the glass that can eventually become lossy. The concentration of the $D_i$ terms at time 0 gives the weights for the activation energies in the distribution of activation energies. The parameter p allows relative weighting of the two forms of activity.

The model above can be fit based on experimental data from appropriate experiments to estimate the activity. Subsequent experiments are helpful in refining the activity to improve the accuracy of long-term prediction.

EXAMPLE

Figure 6:
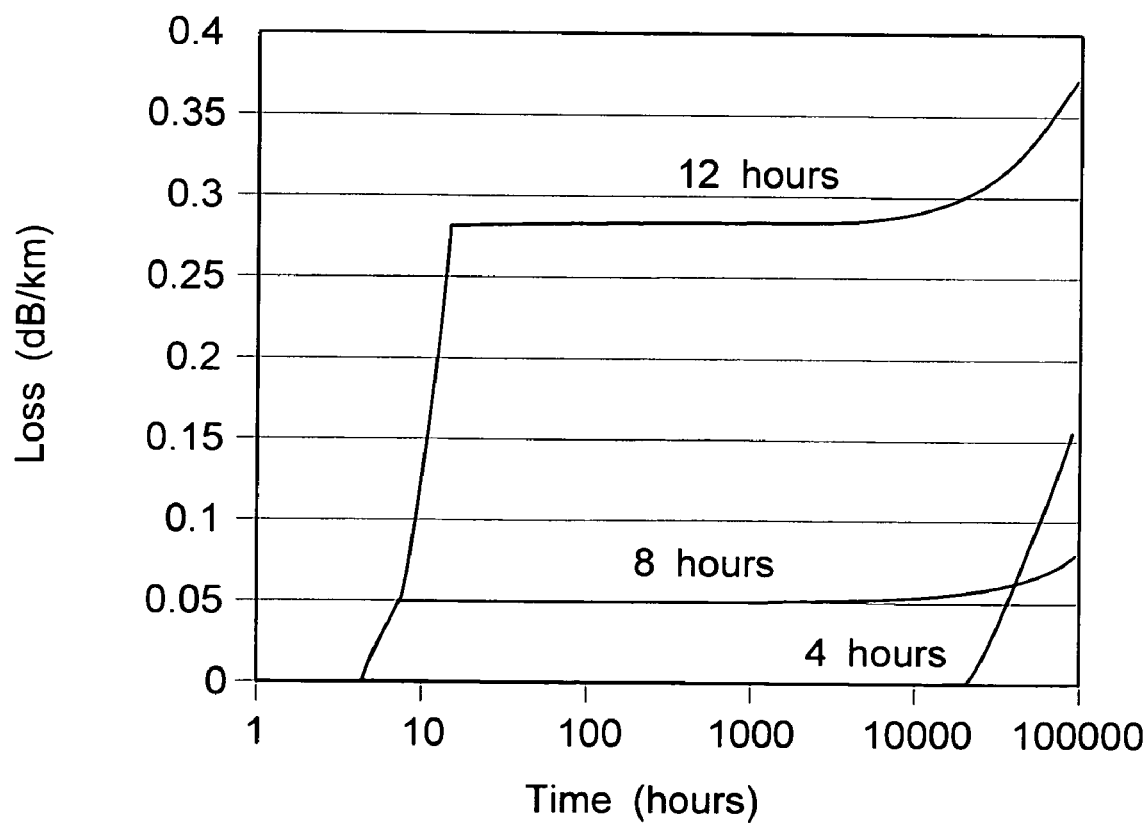
FIG. 6 is a plot of loss vs. time giving comparative simulation data for different treatment times.

To demonstrate the effective application of the concepts described above a multimode fiber was fabricated with a Ge—P doped core. The optical fibers were treated in a heated furnace with an atmosphere of deuterium mixed with nitrogen. Nominal overall pressure was 1 atmosphere. After several experiments were conducted to determine hydrogen and deuterium activity and appropriate values of v in equation (1) above, simulations were performed to predict fiber end-of-life performance after passivation at 72C and 1 atm of deuterium for different times. The exposure durations of 4, 8 and 12 hrs are plotted in the FIG. 6. In service conditions were assumed to be 25 C and $10^{-4}$ atm of hydrogen, with an operating lifetime of 10 yrs. The short passivation (4 hrs) is inadequate for reacting a sufficient population of reactive sites while the long passivation (12 hrs) is excessive. Minimum end-of-life loss is found at passivation duration of 8 hrs.

Based on this and other experiments an optimum range for the three treatment parameters was established. The preferred treatments comprise an initial treatment in heated deuterium, followed by a drive-in anneal in an inert gas, e.g., nitrogen. In the initial treatment the deuterium may be diluted with inert gas to the desired deuterium pressure. The inert gas drive-in allows diffusion of absorbed deuterium through the fiber, and allows the desired reactions to occur. The pressure of deuterium is preferably 0.25 to 0.75 atmospheres and the preferred overall treatment period is in the range 18 to 30 hours, with a deuterium treatment period of two to six hours. The corresponding treatment temperature range is 65 to 100 degrees C.

From the standpoint of practical commercial production and other considerations recommended process conditions are 0.4+/−0.2 atmospheres of deuterium for 3+/−1 hours, followed by 21+/−5 hours of heating in an inert atmosphere with the temperature in the range 82-92 degrees C.

Figure 7:
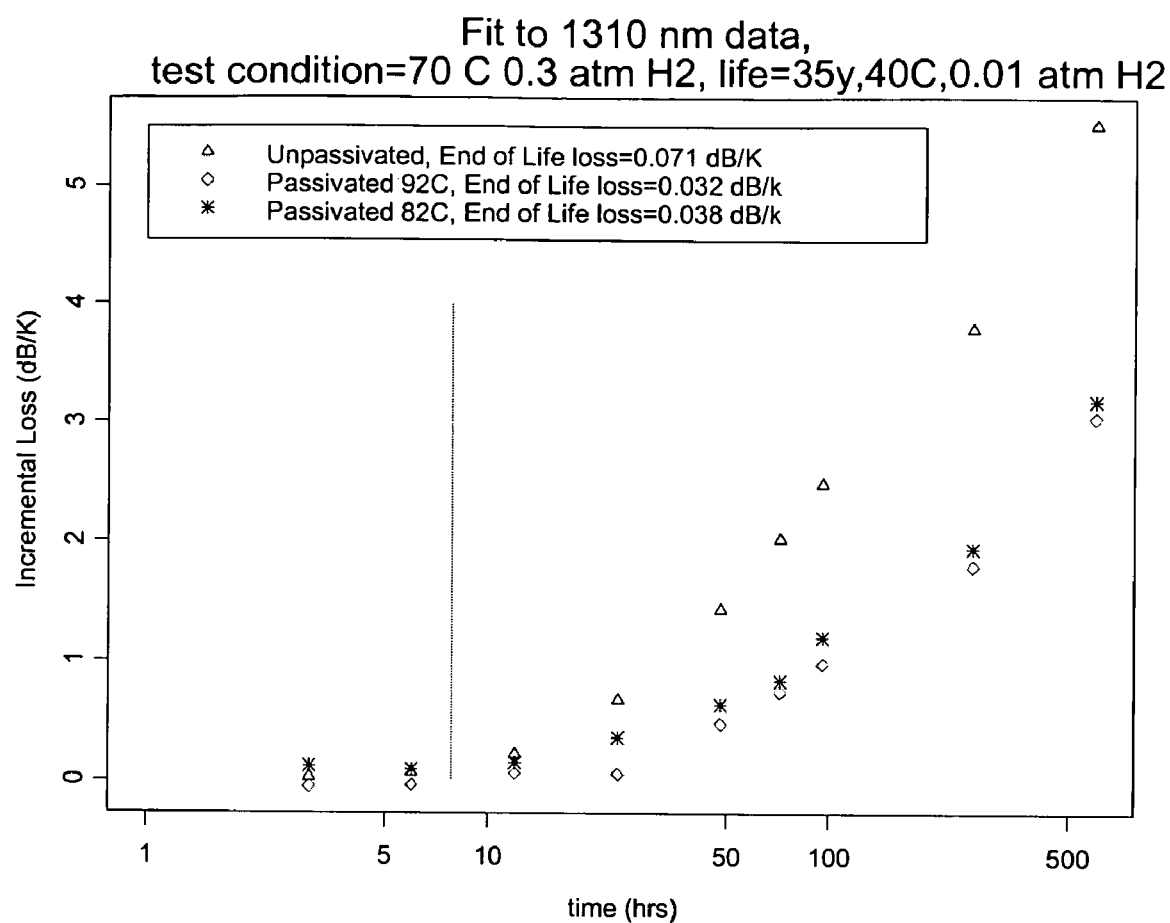
FIG. 7 shows experimental data comparing unpassivated and passivated optical fiber at accelerated conditions, with a projection to operating conditions.

FIG. 7 provides raw data measured from unpassivated fiber vs passivated fiber, measured at 1310 nm, at an accelerated condition of 70° C., 0.3 atmosphere $H_2$. The optical fiber composition was 14% $P_2O_5$, 13% $GeO_2$, 73% essentially $SiO_2$. The horizontal axis is time at the accelerated condition in hours. The vertical axis is incremental loss in dB per kilometer. The vertical line at approximately 5 hours is a rough estimate of the time at the accelerated condition corresponding to end of life for exposure at 40 C., 35 years, 0.01 atm hydrogen. The estimate of end of life loss for each fiber is given in the legend. The effect of passivation can be clearly seen as the unpassivated fiber (triangle symbol A) stays strictly above the passivated fibers once the noise floor of the measurement is exceeded.

The doping levels of optical fibers that may be treated by the processes described herein may vary substantially. Compositions of primary interest, and those that are most susceptible to excessive loss from deuterium passivation, are silica-based optical fibers co-doped with $GeO_2$ and $P_2O_5$. In general, the mol ratio of $GeO_2$ to $P_2O_5$ may vary widely, for example, from 0.5 to 10. The overall dopant concentration typically varies from 15 to 32 mol %, remainder $SiO_2$. The phosphorus content is generally in the range 2 mol % to 20 mol %. Specific compositions of interest are $GeO_2$ 20%+/−3% with $P_2O_5$ 3%+/−1%, and $GeO_2$ 13%+/−3% with $P_2O_5$ 14%+/−3%.

Multimode fiber that is the subject of the foregoing description can be recognized as generally having a relatively large core diameter, typically greater than 10 microns. This property distinguishes the optical fiber from single mode optical fiber that typically has a core diameter of 6 microns or less.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the claims.

The invention claimed is:

1. Method for passivating an optical fiber, wherein the optical fiber is $SiO_2$ co-doped with $GeO_2$ and $P_2O_5$, comprising the step of heating the optical fiber in an atmosphere containing deuterium at a temperature in the range 65-100 degrees C. for at least 2 hours and then heating the optical fiber in an inert atmosphere at a temperature in the range of 65-100 degrees C.

2. The method of claim 1 wherein the optical fiber is co-doped with $GeO_2$ and in the range 15 mol % to 30 mol %.

3. The method of claim 2 wherein the amount of $P_2O_5$ is at least 2 mol %.

4. The method of claim 2 wherein the remaining mol % comprises $SiO_2$.

5. The method of claim 1 wherein the atmosphere comprises 0.25-0.75 atmospheres of deuterium.

6. The method of claim 1 wherein the atmosphere comprises 0.25-20 0.75 atmospheres of deuterium, the remainder of the atmosphere being nitrogen.

7. The method of claim 1 wherein the composition of the optical fiber is $GeO_2$ 20% +/−3 mol % with $P_2O_5$ 3% +/−1 mol %.

8. The method of claim 1 wherein the composition of the optical fiber is $GeO_2$ 13% +/−3 mol % with $P_2O_5$ 14% +/−3 mol %.

9. The method of claim 1 wherein the optical fiber is multimode fiber.

10. The method of claim 9 wherein the optical fiber has a core with a diameter greater than 10 microns.

11. The method of claim 1 wherein the heating of the optical fiber in the inert atmosphere occurs for a period in the range 16-26 hours.

12. The method of claim 11 wherein the passivating conditions are 0.4 +/−0.2 atmospheres of deuterium for 3 +/−1 hours.

13. The method of claim 1 wherein the inert atmosphere contains nitrogen.

14. The method of claim 1 wherein the heating of the optical fiber in the inert atmosphere occurs for at least 16 hours.

15. The method of claim 1 wherein the heating of the optical fiber in the atmosphere containing deuterium occurs for 3 +/−1 hours.

16. The method of claim 1 wherein the heating of the optical fiber in the inert atmosphere is at a temperature in the range of 82-92 degrees C.

* * * * *

UNITED STATES PATENT AND TRADEMARK OFFICE
CERTIFICATE OF CORRECTION

PATENT NO. : 8,111,961 B2
APPLICATION NO. : 12/072433
DATED : February 7, 2012
INVENTOR(S) : David J. DiGiovanni et al.

It is certified that error appears in the above-identified patent and that said Letters Patent is hereby corrected as shown below:

In the claims:

Column 14, line 2, cancel the text "0.25-020 0.75" and replace the canceled text with the following: "0.25-0.75" such that Claim 6 (Column 14, lines 1-3) now reads as follows:
6. The method of claim 1 wherein the atmosphere comprises 0.25-0.75 atmospheres of deuterium, the remainder of the atmosphere being nitrogen.

Signed and Sealed this
Twelfth Day of March, 2013

Teresa Stanek Rea
*Acting Director of the United States Patent and Trademark Office*